June 29, 1926.
E. D. KINNEY
1,590,526
HIGHWAY CONSTRUCTION
Original Filed Dec. 3, 1923
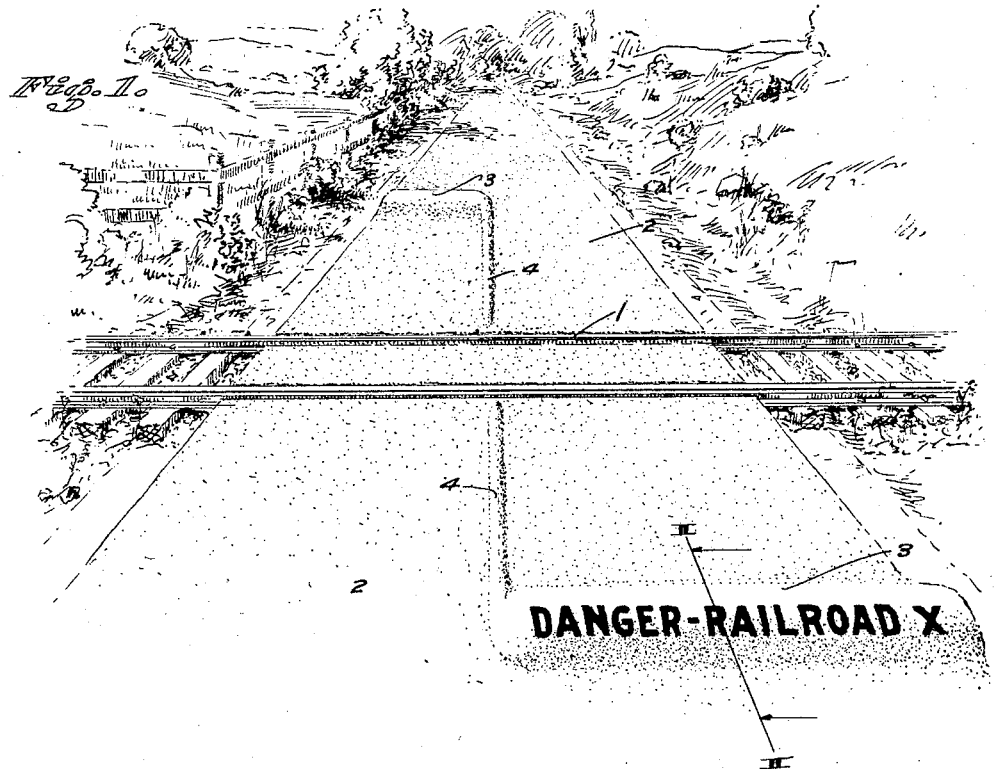
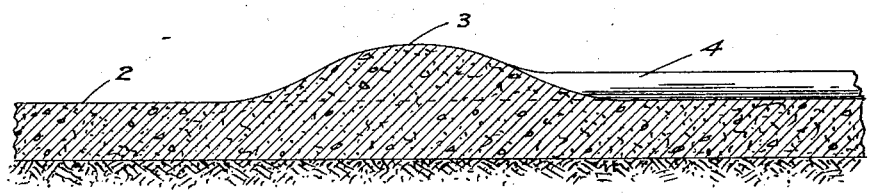
Inventor
E. D. KINNEY
By
Attorney Patented June 29, 1926.

1,590,526

UNITED STATES PATENT OFFICE.

EDWARD D. KINNEY, OF TWIN FALLS, IDAHO.

HIGHWAY CONSTRUCTION.

Application filed December 3, 1923, Serial No. 678,258. Renewed May 3, 1926.

The present invention relates to improvements in highway construction and has particular reference to railroad crossings, it being proposed to provide a means in the roadbed of the highway for forcing an approaching vehicle to slow down so as to prevent possible collisions between the said vehicle and a train. It is customary at the present time to rely on signs disposed at a certain distance from the railroad crossing for giving warning to the driver of an approaching motor vehicle, or to rely on sounds produced by the engine of the train, but it frequently happens that the signs as well as the signals fail to attract the attention of the driver of the motor vehicle.

It is proposed in the present invention to provide a hump in the roadbed of the highway over which the motor vehicle has to travel and which will naturally cause the driver to slow down. It is further proposed to provide means in this connection for preventing the driver from avoiding the hump by passing around the same. Further objects and advantages of my device will appear as the specification proceeds.

The preferred form of my invention is illustrated in the accompanying drawing, in which Figure 1 is a perspective view showing the general arrangement of my hump relative to the roadbed and the railroad crossing; and Figure 2 a section taken along line II—II of Figure 1. While I have shown only the preferred form of my invention, I wish to have it understood that various changes or modifications may be made within the scope of the claims hereto attached without departing from the spirit of the invention.

The railroad track (1) is shown as crossing the roadbed (2) of a highway in such a manner as to make possible a collision between a train crossing the roadbed and a vehicle crossing the railroad track. In order to force the driver of a motor vehicle or the like to slow down before crossing the railroad track, I provide a hump (3) in the roadbed on either side of the railroad track. These humps are disposed at a suitable distance from the railroad track and are preferably arranged transversely to the roadbed on that half of the same which is normally used by vehicles approaching the track, that is, according to American customs, on the right hand side of the roadbed.

The humps may be of sizes varying for different conditions and should be sufficiently pronounced to cause the driver of a motor vehicle to slow down for the purpose of passing over the same, or to give him a severe jolt in case he does not heed the warning. That side of the hump which is visible to approaching vehicles should be painted with a sign showing the reason for slowing down, as for instance "Danger— railroad crossing" or if the hump is used for the purpose of giving warning of steep grades or sudden curves, other appropriate remarks should be painted on the same. To differentiate the humps used for different purposes by other means than by letters, for the benefit of persons not capable of reading the language of the country, suitable color combinations could be used, as for instance red for railroad crossings, blue for sharp curves, etc.

To prevent the driver of the motor vehicle from passing around the hump by using the left-hand side of the street I provide curbs (4) in the center of the street connecting with the humps and extending from either hump to within close proximity of the railroad track, so that no vehicle can pass the track region without having to traverse either one of the humps or one of the curbs, which would necessarily force him to slow down.

The advantages of my invention are apparent. Usually the right of way of the railroad extends sufficiently far that the hump plan could be installed entirely on railroad property. The only up-keep would be an occasional repainting of the signs. The warning is positive and cannot possibly be overlooked by the driver of any machine, even if the latter were inclined to disregard visible or audible signals.

My plan can be installed on dirt roads as well as on paved roads, and would cost much less than any other equally efficient appliance. Since the hump is only on the right-hand side of the road it does not prevent a quick get-away for a motor vehicle after the same has crossed the danger zone.

I claim:

1. In combination, a railroad track, a roadbed crossing the same, a transverse hump in the roadbed in operative proximity to the crossing for forcing an approaching vehicle to slow down before passing the crossing, said hump extending only over that side of the roadbed used by approaching vehicles, and a central curb on the roadbed connecting with the hump for preventing the vehicle from avoiding the hump.

2. In combination, a railroad track, a roadbed crossing the same, a transverse hump in the roadbed in operative proximity to the crossing for forcing an approaching vehicle to slow down before passing the crossing, said hump extending only over that side of the roadbed used by approaching vehicles, and a central curb on the roadbed connecting with the hump for preventing the vehicle from avoiding the hump, the curb extending from the hump to the track.

EDWARD D. KINNEY.